United States Patent Office 3,345,334
Patented Oct. 3, 1967

3,345,334
POLYUREAS, POLY(DIAZOLIDIONES), AND PROCESS FOR CONVERTING POLYUREAS TO POLY(DIAZOLIDIONES)
Rudolph J. Angelo, Graylyn Crest, Del., assignor to E. I. du Pont de Nemours and Company, Wilmington, Del., a corporation of Delaware
No Drawing. Filed Mar. 6, 1967, Ser. No. 620,639
17 Claims. (Cl. 260—47)

ABSTRACT OF THE DISCLOSURE

Polymers having the recurring unit

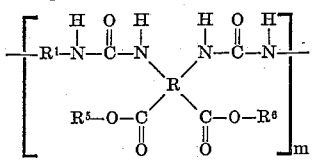

polymers having the recurring unit

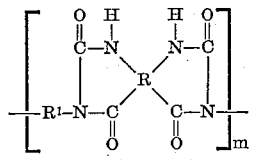

and the processes of converting a polyurea to poly(1,3-diazoli-2,4-dione) or poly(1,3-diazoli-2,4-dione/urea).

Related applications

This is a continuation-in-part of my copending applications Ser. No. 270,523 and Ser. No. 270,522, both filed Apr. 4, 1963, and both now abandoned.

Summary of the invention

The present invention provides as one novel class of polymers poly(1,3-diazoli-2,4-diones), hereinafter called poly(diazolidiones). These polymers are extremely stable at high temperatures and are inert to most solvents at all temperatures. In the form of shaped articles, e.g. films, fibers, rods, tubes, etc., they are substantially colorless, flexible, strong and, in short, have a multitude of desirable properties. Their stability, although a very desirable characteristic in many end uses, makes these polymers very difficult to form into shaped articles. For example, they cannot be melt extruded easily because of their thermal stability as characterized by their high melting points.

Another discovery of this invention overcomes this particular shortcoming and provides a process for producing shaped articles of the poly(diazolidiones). This process involves first forming a shapeable intermediate, then shaping the intermediate into a useful article and, thereafter, converting the intermediate in the form of the shaped article into the stable polymer containing the diazolidione rings. This process is similarly applicable to the polyureas and their corresponding poly(1,3-diazoli-2,4-dione/ureas) of my copending application Ser. No. 270,522, filed Apr. 4, 1963, and its continuation-in-part Ser. No. 620,590, filed Mar. 6, 1967. The process discovery will first be described as it relates to poly(diazolidiones) and its precursors.

Specifically, the process involves first forming a polyurea of a diamino, diester of an organic dibasic acid by the reaction of at least one arylene diisocyanate and at least one diamino compound, the latter having two esterified carboxyl groups, each being ortho to an amino group when the starting acid is aromatic and each being attached to a carbon atom to which an amino group is also attached when the acid is aliphatic, i.e. as close as possible in accordance with the structural limitations of the compound. In the next step, the polyurea is shaped into a useful article, e.g. by casting a film or extruding filaments through a spinneret. Thereafter, the polyurea in the form of the shaped article may be heated so that it converts to the corresponding poly(diazolidione) by the elimination of one molecule of alcohol per diazolidione ring.

The final cyclized products, the poly(1,3-diazoli-2,4-dione), are of the following general formula:

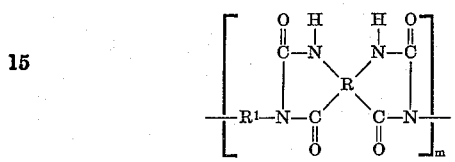

where $R^1$ is a divalent aromatic radical selected from the group consisting of phenylene, naphthylene, biphenylene, anthrylene, furylene, benzfurylene, fluorenylidene, and

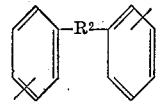

wherein $R^2$ is selected from the group consisting of alkylene of 1–4 carbon atoms, —O—, $$-S-,\ -\underset{R^4}{\overset{R^3}{N}}-,\ -\underset{R^4}{\overset{R^3}{Si}}-,\ -O-\underset{R^4}{\overset{R^3}{Si}}-O-,\ -\overset{O}{\underset{O}{S}}-,\ -\overset{R^3}{\underset{O}{P}}-\ \text{and}\ -O-\overset{R^3}{\underset{O}{P}}-O-$$

where $R^3$ and $R^4$ are selected from the group consisting of alkyl and aryl, the divalent organic radical being further selected from the group consisting of substituted aromatic $R^1$ radicals wherein the substituents are attached directly to an aromatic ring and are selected from the group consisting of 1 to 2 alkyl radicals of 1–3 carbons each, 1 to 2 alkoxy radicals of 1–2 carbons each, phenoxy and chloro; R is a tetravalent organic radical selected from the group consisting of aliphatic radicals of 2 through 8 carbon atoms,

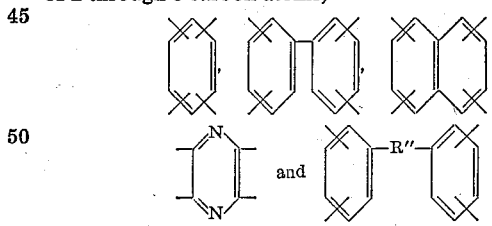

where R'' is selected from the group consisting of methylene, oxygen, sulfur and sulfone, the two valences extending to the right and left from R in said structural formula being attached to adjacent carbon atoms of an aromatic ring in R when R is aromatic and being attached to the same carbon atom in R when R is aliphatic; and m is an integer sufficient to provide an inherent viscosity of at least about .05 as measured at 30° C. as an 0.5% by weight solution in sulfuric acid. When R is aromatic, the products are poly(quinazoline-2,4-diones): and when R is is aliphatic, poly(imidazoline-2,4-diones).

The starting materials in the specified process are diamino organic, dibasic acids and arylene diisocyanates. The acids are characterized by having each carboxyl group ortho to an amino group when the acid is aromatic and having each pair of carboxyl and amino groups attached to the same carbon atom when the acid is aliphatic. In the process, the carboxyl groups of the diamino, dibasic acid are blocked by esterification in the conventional manner, e.g. with an alcohol, an organic halide in alkaline medium, boron trifluoride and isobutylene, diazomethane, etc., preparatory to reaction with the diisocyanate to form the polyurea.

The diamino, dibasic acids useful in making poly(1,3-diazoli-2,4-dione) include: 2,4-diamino isophthalic acid; 4,6-diamino isophthalic acid; 2,3-diamino terephthalic acid; 2,5-diamino terephthalic acid; 3,3'-dicarboxy-4,4'-diamino biphenyl; bis (3-carboxy-4-aminophenyl) methane; 1,4-diamino-2,3-dicarboxy naphthalene; 1,5-diamino-2,6-dicarboxy naphthalene; bis(3-amino-4-carboxyphenyl) methane; 3,3'-diamino-4,4'-dicarboxy biphenyl; bis(3-carboxy-4-aminophenyl) ether; bis(3-amino-4-carboxyphenyl ether; bis(3-carboxy-4-aminophenyl) sulfide; bis-(3-amino - 4 - carboxyphenyl) sulfide; bis(3-carboxy-4-aminophenyl) sulfone; bis(3-amino-4-carboxyphenyl) sulfone; α,α'-diaminoadipic acid; α,α'-diaminopimelic acid; α,α'-diaminosebacic acid; α,α'-diaminosuccinic acid; α,α'-diaminosuberic acid; α,α'-diaminoazelaic acid; 2,5-diamino-3,6-dicarboxy pyrazine; 1,4 - diamino-1,4-dicarboxycyclohexane, 2,5-dicarboxy piperazine; 2,3-dicarboxy piperazine.

The diisocyanates useful in the present invention are those having the following structural formula:

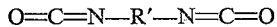

wherein R' is as defined hereberfore. Among the diisocyanates which are suitable for use in the present invention are: meta-phenylene diisocyanate; para-phenylene diisocyanate; 2,4-toluene diisocyanate; 4,4'-dimethoxy-3,3'-diisocyanatobiphenyl; 3,3' - dimethoxy-4,4'-diisocyanatobiphenyl; 4-chloro-1,3-phenylene diisocyanate; 1,5-naphthylene diisocyanate; 2,6-naphthylene diisocyanate, bis (4-isocyanatophenyl) methane; bis(4-isocyanatophenyl) ethane; cumene - 2,4 - diisocyanate; 4 - methoxy - 1,3-phenylene diisocyanate; 4-phenoxy-1,3-phenylene diisocyanate; 4-ethoxy-1,3-phenylene diisocyanate; 2,4'-diisocyanato diphenyl ether; 4,4'-diisocyanato diphenyl ether; 5,6-dimethyl-1,3-phenylene diisocyanate; 2,4-dimethyl-1,3-phenylene diisocyanate; benzidine diisocyanate (4,4'-diisocyanato diphenyl); 4,6-dimethyl-,3-phenylene diisocyanate; 1,4-anthracene diisocyanate; 9,10-anthracene diisocyanate; 3,3'-dimethyl-4,4'-diisocyanato diphenyl; 2,5-fluorene diisocyanate; 2,6-diisocyanato benzfurane; furylene-2,5-diisocyanate; 4,4'-diisocyanato diphenyl sulfide; 3,3'-diisocyanato triphenyl amine; 3,3'-diisocyanato diphenyl sulfone; bis-(4-isocyanatophenyl) diethyl silane; phenyl-bis-(3-aminophenyl) phosphine oxide; bis(isocyanatophenyl) phenylphosphonate; and dimethyl-bis-(3-isocyanatophenoxy) silane. It should be noted that in the preferred diisocyanates, the two isocyanate groups are attached directly to an aromatic ring and may be attached either to the same ring or to different rings.

The first step in the process involves the preparation of a polyurea by the reaction of at least one arylene diisocyanate with at least one diamino diester of an organic dibasic acid, preferably of an aromatic acid. The esters, prepared from the acids by conventional methods, i.e. reaction with an alcohol of the formula $R^5OH$ or $R^6OH$ wherein $R^5$ and $R^6$ are lower alkyl or aryl, have carboalkoxy or carboaryloxy substituents, each of these substituents being ortho or alpha to each amino group so that there are two pairs of amino and ester groups, the members of each pair being as close together as is structurally possible. The esters are usually of the carbomethoxy, carbopropoxy, and carbobutoxy variety.

Reaction is generally obtained by first dissolving the diamino compound in an inert solvent, e.g. N-methyl pyrrolidone, dioxane, monochlorobenzene, toluene, dimethylformamide, dimethylacetamide, dimethylsulfoxide, tetramethylene sulfone, carbon tetrachloride, acetone, methyl ethyl ketone, methyl isobutyl ketone, etc. A basic catalyst, usually a tertiary amine e.g. triethylamine, trimethylamine, triisopropylamine, tri-n-butylamine, pyridine, quinoline, isoquinoline, N,N-dimethylaniline, etc. is added followed by the addition of the diisocyanate, usually dissolved in the same solvent used for the diamine. The mixture is then allowed to warm by its own heat of reaction. The time required to produce a polymer is usually 0.5–3 hours but may be more or less depending upon the desired degree of polymerization.

The intermediate polyurea may be represented by the following formula:

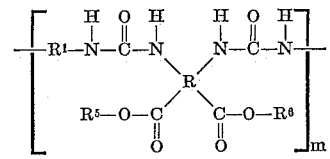

wherein R, R', R" and m are as hereinbefore defined and $R^5$ and $R^6$ are each lower alkyl (1–5 carbon atoms) or aryl.

After forming the polyurea, the polymer may be cast or extruded as a film, filament, rod, tube, etc. The shaped article obtained may then be heated to a temperature of at least 200° C. but below the degradation temperature of the final polymer, preferably in a vacuum or inert atmosphere, for a time sufficient to cyclize the polyurea to the poly(diazolidione). The time required for cyclizing will depend upon the particular polyurea and the amount of the polyurea present in the intermediate composition and will vary from a few minutes to an hour or more.

Another method of converting the polyurea article to poly(diazolidione) involves treatment with alcohol-removing compounds that do not affect the starting or final polymer adversely. The treatment is a base catalysis and any of the following materials may be used: alkali alkoxides or alkaline earth alkoxides (e.g. potassium tertiarybutoxide, sodium methoxide, magnesium isopropoxide), alkali carbonates (sodium carbonate, potassium carbonate), alkali hydrides (lithium hydride, sodium hydride, potassium hydride). The chemical converting agents are usually applied from solution in a suitable solvent, e.g. ethanol. Still another method of converting the polyurea to poly(diazolidione) involves both chemical addition and heat, the heat usually being applied subsequent to the chemical treatment.

It should be understood that the intermediate polymer for shaping need not be composed completely of polyurea. Some of the cyclic product may be present. However, the intermediate polymeric composition must contain sufficient polyurea to be shapeable.

It should be understood that the sulfur analogs may be substituted for the diamino compounds and/or the diisocyanates in the process of this invention. In this manner, a bis amino, thio or thiol or dithio acid ester and/or a diisothiocyanate may be substituted for all or part of the dicarboalkoxy diamino compound and/or diisocyanate to prepare the intermediate that eventually leads to a poly-(diazolidione) having one or more oxygen atoms replaced by sulfur atoms.

As noted above, the process discovered is similarly applicable to the prepartion of poly(1,3-diazoli-2,4-dione/ urea) from the corresponding polyurea. These polymers and details of preparation of both, as well as conversion procedures of converting the polyurea to the poly(diazolidione/ureas), are described in my copending application Ser. No. 270,522, filed Apr. 4, 1963, which is hereby incorporated herein in its entirety.

Specifically, this process involves first forming a polyurea of a diamino, monobasic ester of an organic acid by the reaction of at least one arylene diisocyanate and at least one diamino compound, the latter having one esterified carboxyl group ortho to an amino group when the starting acid is aromatic and being attached to a carbon atom to which an amino group is also attached when the acid is aliphatic, i.e. as close as possible in accordance with the structural limitations of the compound. The polyurea is shaped into a useful article and the shaped article may be heated so that it converts to the corresponding poly(diazolidione/urea) by the elimination of one molecule of alcohol per diazolidione ring, all identical in detail as described above with respect to the preparation of the poly(diazolidione).

The cyclized product is poly(1,3-diazoli-2,4-dione/urea) having the general formula

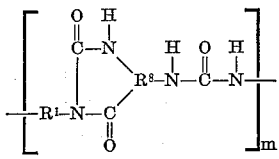

where $R^8$ is a trivalent organic radical selected from the group consisting of aliphatic radicals of 2 through 8 carbon atoms,

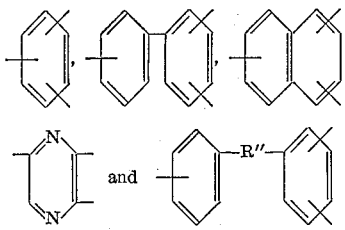

where $R''$ is selected from the group consisting of methylene, oxygen, sulfur and sulfone, the two valences extending to the left from $R^8$ in said structural formula being attached to adjacent carbon atoms of an aromatic ring in $R^8$ when $R^8$ is aromatic and being attached to the same carbon atom in $R^8$ when $R^8$ is aliphatic; $R^1$ is a divalent aromatic radical as defined hereinbefore; and $m$ is an integer sufficient to provide an inherent viscosity of at least 0.1 as measured at 30° C. as an 0.5% by weight solution in sulfuric acid.

The intermediate polyurea may be represented by the following formula:

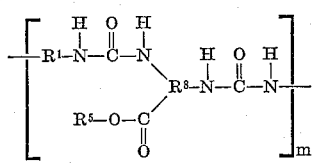

where $R^1$, $R^8$ and $m$ are as just defined and $R^5$ is as defined hereinbefore with respect to the poly(1,3-diazoli-2,4-dione) polyurea precursor.

The starting materials for this embodiment are diamino organic, monobasic acids and arylene diisocyanates. The latter are disclosed hereinbefore to which reference should be made. The diamino, monobasic acids useful include: 2,4-diamino benzoic acid; 2,5-diamino benzoic acid; 3-carboxy-4,4'-diamino biphenyl; 3 - carboxy-4,4'-diamino biphenyl methane; 1,4-diamino-2-napthoic acid; 1,5-diamino-2-napthoic acid; 2,6-diamino-1-napthoic acid; lysine ($\alpha,\epsilon$-diaminocaproic acid); ornithine ($\alpha,\epsilon$-diaminovaleric acid); 3,3'-diamino-4-carboxy diphenyl methane; 3-carboxy-4,4'-diamino diphenyl ether; 3,3'-diamino-4-carboxy diphenyl ether; 3-carboxy-4,4'-diamino diphenyl sulfide; 3,3'-diamino-4-carboxy diphenyl sulfide; 3-carboxy-4,4'-diamino diphenyl sulfone' 3,3'-diamino-4-carboxy diphenyl sulfone; $\alpha,\beta$-diamino butyric acid; $\alpha,\gamma$-diamino butyric acid; $\alpha,\gamma$-diamino valeric acid; 1,4-diamino hexahydrobenzoic acid; 2,5-diamino-3-carboxy pyrazine; and 2-carboxy piperazine.

Both disclosed classes of polyureas and their cyclized products are film-forming and have the same utility.

The invention will be more clearly understood by referring to the examples which follow. It is understood that the examples, although illustrating specific embodiments of the present invention, should not be considered limitative of the invention.

The determination of the structure is accomplished by Infrared Spectral Techniques [1] known to those skilled in the art. The majority of the infrared spectra herein were taken on pressed films by the use of a Perkin-Elmer Model 21 Spectrophotometer and a Perkin-Elmer Infracord Spectrophotometer.

Inherent viscosity, which is directly related to the molecular weight of the polymer, is defined by L. H. Cragg in the Journal of Colloid Science, volume I, pages 261–9 (May 1946) as:

$$\text{Inherent viscosity} = \frac{\ln \text{ relative viscosity}}{C}$$

where relative viscosity is the ratio of the solution viscosity to the solvent viscosity, and $C$ is the concentration of solute in solution measured as grams of polymer per 100 ml. of solution.

*Example 1*

Alpha, alpha'-diamino pimelic acid (20.0 g.; 0.105 mole) was slurried in 125 ml. of absolute ethanol which had been saturated with dry hydrogen chloride gas. As slow addition of this gas was continued, the temperature of the slurry rose to about 60–65° C. After 30 minutes the slurry had changed to a sparkling clear, slightly yellow solution of the dihydrochloride of the diamino diethyl diester.

The dihydrochloride of the diamino diester (1.595 g.; 0.005 mole) was dissolved in 5 ml. of N,N-dimethylacetamide with warming on a steam bath. To this was added a solution of 1.010 g. of triethylamine in 2 ml. of N,N-dimethylacetamide, giving immediate precipitation of white triethylamine hydrochloride. After the addition of 2 ml. more of N,N-dimethylacetamide, a solution of 1.250 g. (0.005 mole) of bis(4-isocyanatophenyl) methane in 5 mls. of N,N-dimethylacetamide was introduced. Both temperature and viscosity increased, the temperature to about 60° C. The resulting bright yellow solution (still containing solid triethylamine hydrochloride) was stirred while it cooled to room temperature.

The triethylamine hydrochloride was removed by filtration, and the clear, yellow, somewhat viscous solution was cast onto a glass plate and dried in a 165° C. oven to give a clear, fairly tough, flexible film. The infrared spectrum of this polymer confirmed that it was the polyurea:

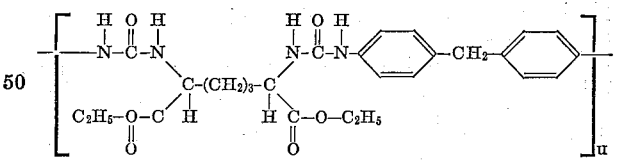

The inherent viscosity of this polymer was 0.36 (as a 0.5% solution in N,N-dimethylacetamide).

Heating at 200° C. for 15 minutes and 310° C. for 7 minutes produced a darker film whose infrared spectrum provided conclusive evidence of cyclization to the desired heterocyclic polymer:

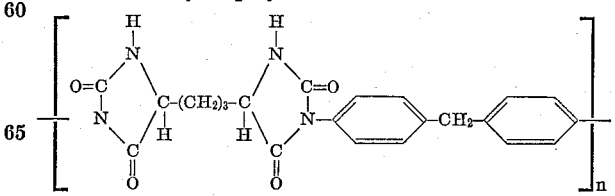

*Example 2*

Another sample of the polyurea of Example 1, prepared in a similar manner, was converted to the same ---
[1] W. M. D. Bryant and R. C. Voter, Journal of American Chemical Society, 75, 6113 (1953); and F. W. Billmeyer, "Textbook of Polymer Chemistry," chapter 7, Interscience Publishers, 1957.

polyimidazolinedione by chemical means. This involved submersing the polyurea film in a 0.2% by weight solution of potassium t-butoxide in absolute ethanol.

The films of Examples 1 and 2 displayed superior properties; tensile strengths at 23° C. of over 10,000 p.s.i., thermal stabilities in air at 275° C. for about one hour; both insoluble in N,N-dimethylacetamide, N,N-dimethylformamide and most organic solvents, densities of about 1.28, tensile moduli at 23° C. of about 450,00 p.s.i., zero strength temperatures of about 290° C. etc.

Example 3

To one liter of dry methanol saturated with dry hydrogen chloride was added 136.0 g. of 4,4'-diamino-3,3'-dicarboxybiphenyl. The mixture was refluxed gently for three days while hydrogen chloride was bubbled through at a slow rate. The resulting dark solution was treated with sodium bicarbonate until no further frothing was noticed. The resulting dark solid ester was washed several times with water, filtered and dried to 87.0 g. of product.

Approximately 20 g. of this product was recrystallized from ethanol and water with decolorizing charcoal. This product was vacuum sublimed to give 9.4 g. of a yellow solid ester melting at 45–47° C.

From the infrared spectrum of this product, it was evident that the desired compound, 4,4'-diamino-3,3'-dicarbomethoxybiphenyl, had been obtained. Characteristic absorptions were: N—H at 2.90 and 3.0; CH at 3.3–3.5; C=O (ortho to amino) at 5.95; and N—H at 6.18.

The polyurea of 4,4'-diamino-3,3'-dicarbomethoxybiphenyl and toluene-2,4-diisocyanate was prepared by a solution procedure as follows:

Three grams (0.01 M) of the diamino-diester was dissolved in 10 ml. of N-methyl pyrrolidone. To this was added 1.74 g. (0.01 M) of toluene-2,4-diisocyanate (freshly distilled; B.P.—86° C./0.1 mm.) and three drops of triethylamine. The temperature rose from 25° C. to 42° C. within a few minutes with a slight increase in viscosity. After brief stirring, the solution was stoppered and allowed to sit overnight. The inherent viscosity (dilution in N-methyl pyrrolidone to 0.5%) was found to be 0.11. The solution was cast onto glass plates and dried at 100–120° C. for 15–20 minutes to give clear film. This polymer was identified by infrared as the desired polyurea, possibly containing some quinazolone-2,4-dione rings.

The polyurea film was placed on a metal plate and heated at 300° C. in a vacuum oven for 15 minutes to yield the corresponding polyquinazolone film. This film had an inherent viscosity of 0.09 (0.5% in N-methyl pyrrolidone) and 0.07 (0.5% in sulfuric acid). Its chemical structure was as follows:

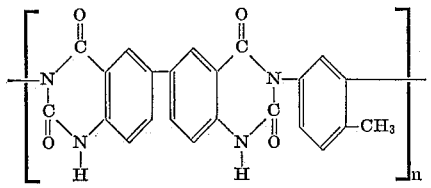

Example 4

A film having the following chemical structure results from substituting 2,5-diaminodiethylterephthalate and 4,4'-diisocyanato diphenyl ether in the same molar amounts for the diamine and diisocyanate used in the procedure of Example 3:

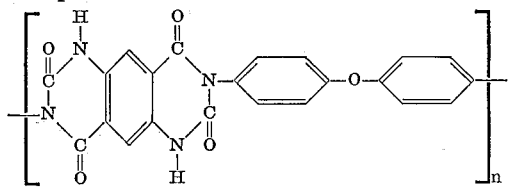

This film has excellent zero strength temperature and thermal stability, even superior to those of the cyclized films of Example 3. Its other properties are approximately the same.

Substitution of 1,5-diamino-2,6-dicarboxy naphthalene for 2,5-diamino terephthalic acid in the procedure immediately above leads to the corresponding poly (naphthazolinedione).

Example 5–7

When the dimethyl ester of 4,6-diamino isophthalic acid or alpha,alpha'-diamino adipic acid or alpha,alpha'-diamino sebacic acid is substituted for the dimethyl ester of 2,5-diamino terephthalic acid in Example 4, the corresponding polyarylurea is produced. Each of these is cast into film and then converted to the corresponding poly (diazolidione) by heating at 275° C. for 30 minutes. A tough, flexible film is produced in each case.

Examples 8–13

Example 4 is repeated, substituting each of the following diisocyanate for 2,4-toluene diisocyanate: m-phenylene diisocyanate; 4,4'-dimethoxy-3,3'-diisocyanatobiphenyl; 4-chloro-1,3-phenylene diisocyanate; 4,4'-biphenylene diisocyanate; 4,4'-diisocyanato diphenyl ether; and 1,5-naphthylene diisocyanate. The product in each case is a tough, flexible film of the corresponding poly(diazolidione).

Example 14

To a solution of 1.710 grams (0.005 mole) of 4,4'-diamino-3,3'-dicarboethoxydiphenylmethane in 5 milliliters of N,N-dimethylacetamide were added a solution of 1.250 grams (0.005 mole) of bis(4-isocyanatophenyl) methane in 5 milliliters of N,N-dimethylacetamide, and 2 drops of triethylamine. As the system was mixed, the temperature rose from 24° C. to 27° C. and a slight yellow color developed. The mixture was heated gently for 15 minutes on a steam bath and then allowed to stand for 1 hour. A portion of the solution was cast onto a glass plate into a clear colorless film of the polyurea. The remainder of the reaction mixture was poured into water in order to precipitate the polyurea, and the precipitated polymer was collected and washed twice with water, twice with acetone and twice with petroleum ether. The product was dried in a vacuum oven under a low presure of nitrogen at 50° C. The infrared spectrum of the product was consistent with that expected for the polyurea. The inherent viscosity of the polymer (0.5%) by weight solution in N,N-dimethylacetamide at 30° C.) was 0.17.

A 15% by weight solution of the polymer in N,N-dimethylacetamide was prepared, and cast into a film on a chromium-plated steel sheet. The film was dried in a vacuum oven at 125° C. under a low pressure of nitrogen for ten minutes.

A representative procedure for preparing a poly(1,3-diazoli-2,4-dione/urea) is as follows:

Example 15

Alpha, epsilon-diamino caproic acid (0.105 mole) is slurried in 125 ml. of absolute ethanol which has been saturated with dry hydrogen chloride gas to produce a yellow solution of the dihydrochloride of the diamino ester.

This dihydrochloride of the diamino ester (0.005 mole) is dissolved in 5 ml. of N,N-dimethylacetamide with warming on a steam bath. To this is added a solution of 1.010 g. of triethylamine in 2 ml. of N,N-dimethylacetamide, giving immediate precipitation of white triethylamine hydrochloride. After the addition of 2 ml. more of N,N-dimethylacetamide, a solution of 1.250 g. (0.005 mole) of bis(4-isocyanatophenyl) ether in 5 mls. of N,N-dimethylacetamide is introduced. Both temperature and viscosity increase the temperature to about 60° C. The resulting bright yellow solution (still containing solid triethylamine hydrochloride) is stirred while it cools to room temperature.

The triethylamine hydrochloride is removed by filtration, and the clear, yellow, somewhat viscous solution is cast onto a glass plate and dried in a 165° C. oven to give a film. The infrared spectrum of this polymer is the polyurea:

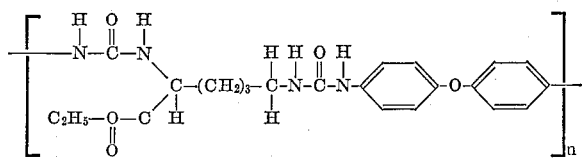

Heating at 200° C. for 15 minutes and 310° C. for 7 minutes cyclizes the polyurea to the desired heterocyclic polymer:

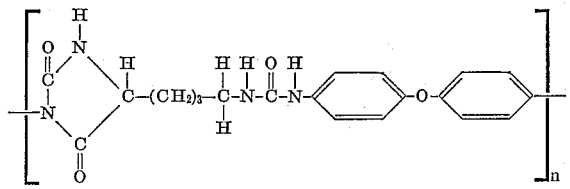

The disclosed polymers find many applications in a wide variety of physical shapes and forms. Among the most significant of these forms are films and fibers. Films and fibers of this polymer not only possess excellent physical properties at room temperature, but retain their strength at elevated temperatures for prolonged periods of time. Because of the solubility of the polymer precursors in the preferred process of preparation, these polymer precursors may be processed into shaped articles such as films, fibers, tubes, rods, sheets and discs by conventional techniques, and then converted into the final high-melting, relatively, intractable cyclized polymer, the poly(diazolidione) or poly(diazolidione/urea).

The final shaped article may consist of the heterocyclic polymer alone or as a blend with other polymers and/or modified with inert materials. Depending on their nature, the inert materials may be added before or after shaping. For example, fillers such as pigments, electrically conductive carbon black and metal particles, abrasives, dielectrics and lubricating polymers may be added conveniently to the intermediate polymer as such or in a solution of the intermediate polymer before shaping. Certain abrasives and electrically conductive materials are better added as surface layers. A cellular form or foam of the final polymer may be produced by adding a conventional blowing agent to the intermediate polymer, either alone or in combination with a filler, followed by heating to decompose the agent and cyclize the polymer units. Alternatively, cellular products can be made by dispersing bubbles (of air, carbon dioxide, nitrogen, etc.) into a melt or solution of the intermediate polymer before shaping and cyclization.

Instead of being shaped itself, the intermediate polymer can be used as a coating composition. Sometimes a melt of this polymer is suitable, but a solution generally is more useful. The liquid coating composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.) polyolefins (polyethylene, polypropylene, polystyrene, etc.); polyesters (polyethylene terephthalate, etc.), polyamides, polyimides, perfluorocarbon polymers (polytetrafluoroethylene, copolymers of tetrafluoroethylene with hexafluoropropylene, etc.), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. Films of the final cyclized polymer can be laminated to any of the above substrates, often with the aid of a commercially available adhesive.

Films formed from the polymer of this invention may be used wherever films have heretofore been used. They serve advantageously in an extensive variety of wrapping, packaging and bundling applications. Additionally, the film-forming polymer may be used in automobile and aviation interior head lining materials, decorative trim, high temperature electrical insulation, in the form of corrosion-resistant pipe, duct work, containers and container lining, and the laminating structures mentioned previously. In fiber form, the polymer of the present invention offers possibilities for high temperature electrical insulation, protective clothing and curtains, filtration media, packing and gusseting materials, brake linings and clutch facings.

What is claimed is:
1. Poly(1,3-diazoli-2,4-dione) having the structural formula

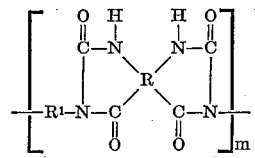

where:
$R^1$ is a divalent aromatic radical selected from the group consisting of phenylene, naphthylene, biphenylene, anthrylene, furylene, benzfurylene, fluorenylidene, and

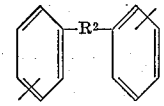

wherein $R^2$ is selected from the group consisting of alkylene of 1–4 carbon atoms, —O—,

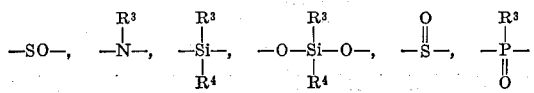

and

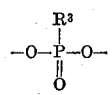

where $R^3$ and $R^4$ are selected from the group consisting of alkyl and aryl, said $R^1$ being further selected from the group consisting of substituted aromatic $R^1$ radicals wherein the substituents are attached directly to an aromatic ring and are selected from the group consisting of 1 to 2 alkyl radicals of 1–3 carbons each, 1 to 2 alkoxy radicals of 1–2 carbons each, phenoxy and chloro;
R is a tetravalent organic radical selected from the group consisting of aliphatic radicals of 2 through 8 carbon atoms,

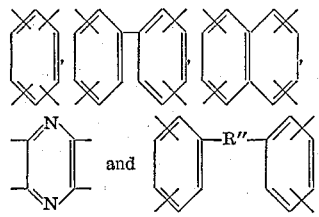

where R″ is selected from the group consisting of methylene, oxygen, sulfur and sulfone; the two valences extending to the right and left from said R being attached to adjacent carbon atoms of an aromatic ring in R when R is aromatic and being attached to the same carbon atom in R when R is aliphatic; and $m$ is an integer sufficient to provide an inherent viscosity of at least about .05 as measured at 30° C. as an 0.5% by weight solution in sulfuric acid.

2. Poly(1,3-diazoli-2,4-dione) as in claim 1 where R' is

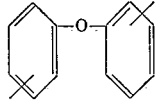

3. Poly(1,3-diazoli-2,4-dione) as in claim 1 wherein R' is

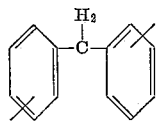

4. Poly(1,3-diazoli-2,4-dione) as in claim 1 wherein R' is phenylene.

5. Poly(1,3-diazoli-2,4-dione) as in claim 1 wherein R' is toluylene.

6. Poly(1,3-diazoli-2,4-dione) as in claim 1 wherein R' is biphenylene.

7. Poly(1,3-diazoli-2,4-dione) as in claim 1 wherein R' is naphthylene.

8. Poly(1,3-diazoli-2,4-dione) as in claim 1 wherein R is

9. Poly(1,3-diazoli-2,4-dione) as in claim 1 wherein R is

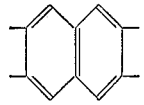

10. Poly(1,3-diazoli-2,4-dione) as in claim 1 wherein R is

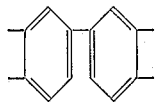

11. Poly(1,3-diazoli-2,4-dione) as in claim 1 wherein R is

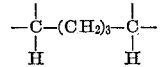

12. A polyurea having the structural formula

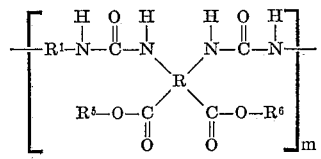

where:

$R^1$ is a divalent aromatic radical selected from the group consisting of phenylene, naphthylene, biphenylene, anthrylene, furylene, benzfurylene, fluorenylidene, and

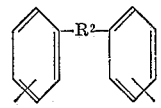

wherein $R^2$ is selected from the group consisting of alkylene of 1–4 carbon atoms, —O—,

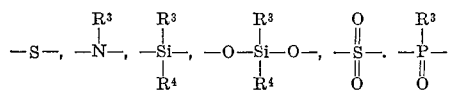

and

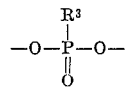

where $R^3$ and $R^4$ are selected from the group consisting of alkyl and aryl, said $R^1$ being further selected from the group consisting of substituted aromatic $R^1$ radicals wherein the substituents are attached directly to an aromatic ring and are selected from the group consisting of 1 to 2 alkyl radicals of 1–3 carbons each, 1 to 2 alkoxy radicals of 1–2 carbons each, phenoxy and chloro;

R is a tetravalent organic radical selected from the group consisting of aliphatic radicals of 2 through 8 carbon atoms,

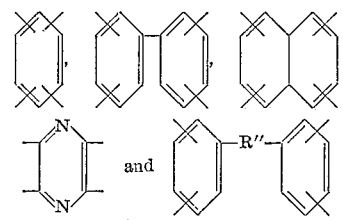

where R″ is selected from the group consisting of methylene, oxygen, sulfur and sulfone; the two valences extending to the right and left from said R being attached to adjacent carbon atoms of an aromatic ring in R when R is aromatic and being attached to the same carbon atom in R when R is aliphatic;

$R^5$ and $R^6$ are each selected from the group consisting of alkyl of 1–5 carbons and aryl; and $m$ is an integer sufficient to provide an inherent viscosity of at least about .05 as measured at 30° C. as an 0.5% by weight solution in N,N-dimethylacetamide.

13. A process comprising heating to a temperature of at least 200° C. a polyurea of claim 12 to cyclize said polyurea into the corresponding poly(1,3-diazoli-2,4-dione).

14. A process comprising treating a polyurea of claim 12 with a basic catalyst selected from the group consisting of alkali alkoxides, alkaline earth alkoxides, alkali carbonates and alkali hydrides to cyclize said polyurea into the corresponding poly(1,3-diazoli-2,4-dione).

15. A process comprising treating a polyurea having the structural formula

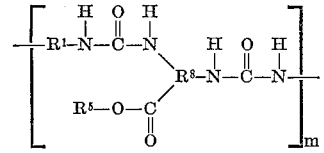

where $R^8$ is a trivalent organic radical selected from the group consisting of aliphatic radicals of 2 through 8 carbon atoms,

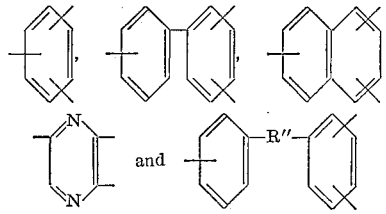

where R" is selected from the group consisting of methylene, oxygen, sulfur and sulfone; the two valences extending to the left from said $R^8$ being attached to adjacent carbon atoms of an aromatic ring in $R^8$ when $R^8$ is aromatic and being attached to the same carbon atom in $R^8$ when $R^8$ is aliphatic; $R^1$ is a divalent aromatic radical selected from the group consisting of phenylene, naphthylene, biphenylene, anthrylene, furylene, benzfurylene, fluorenylidene, and

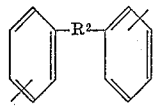

wherein $R^2$ is selected from the group consisting of alkylene of 1–4 carbon atoms,

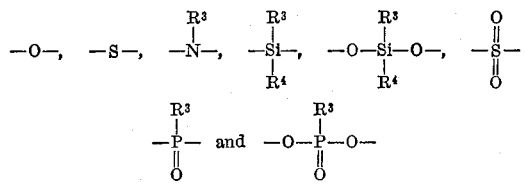

where $R^3$ and $R^4$ are selected from the group consisting of alkyl and aryl, said $R^1$ being further selected from the group consisting of substituted aromatic R' radicals wherein the substituents are attached directly to an aromatic ring and are selected from the group consisting of 1 to 2 alkyl radicals of 1–3 carbons each, 1 to 2 alkoxy radicals of 1–2 carbons each, phenoxy and chloro;

$R^5$ is selected from the group consisting of alkyl of 1–5 carbon atoms and aryl; and m is an integer sufficient to provide an inherent viscosity of at least 0.1 as measured at 30° C. as an 0.5% by weight solution in sulfuric acid, to cyclize said polyurea into the corresponding poly(1,3-diazoli-2,4-dione/urea).

16. A process according to claim 15 in which said polyurea is heated to a temperature of at least 200° C. to cyclize it into the corresponding poly(1,3-diazoli-2,4-dione/urea).

17. A process according to claim 15 in which said polyurea is treated with a basic catalyst selected from the group consisting of alkali alkoxides, alkaline earth alkoxides, alkali carbonates, and alkali hydrides to cyclize it into the corresponding poly(1,3-diazoli-2,4-dione/urea).

References Cited

UNITED STATES PATENTS

| | | | |
|---|---|---|---|
| 2,502,548 | 4/1950 | Allen et al. | 260—78 |
| 3,242,128 | 3/1966 | Chalmers | 260—32.6 |
| 3,244,675 | 4/1966 | Angelo | 260—77.5 |
| 3,261,811 | 7/1966 | Tatum | 260—47 |
| 3,271,366 | 9/1966 | Krenz | 260—47 |
| 3,278,493 | 10/1966 | Angelo | 260—77.5 |
| 3,282,898 | 11/1966 | Angelo | 260—47 |

FOREIGN PATENTS 1,105,606  7/1961  Germany.

DONALD E. CZAJA, *Primary Examiner.*

F. McKELVEY, *Assistant Examiner.*